(No Model.)
W. JACOBY.
TACK HAMMER.
No. 470,156.　　　　　　　Patented Mar. 1, 1892.
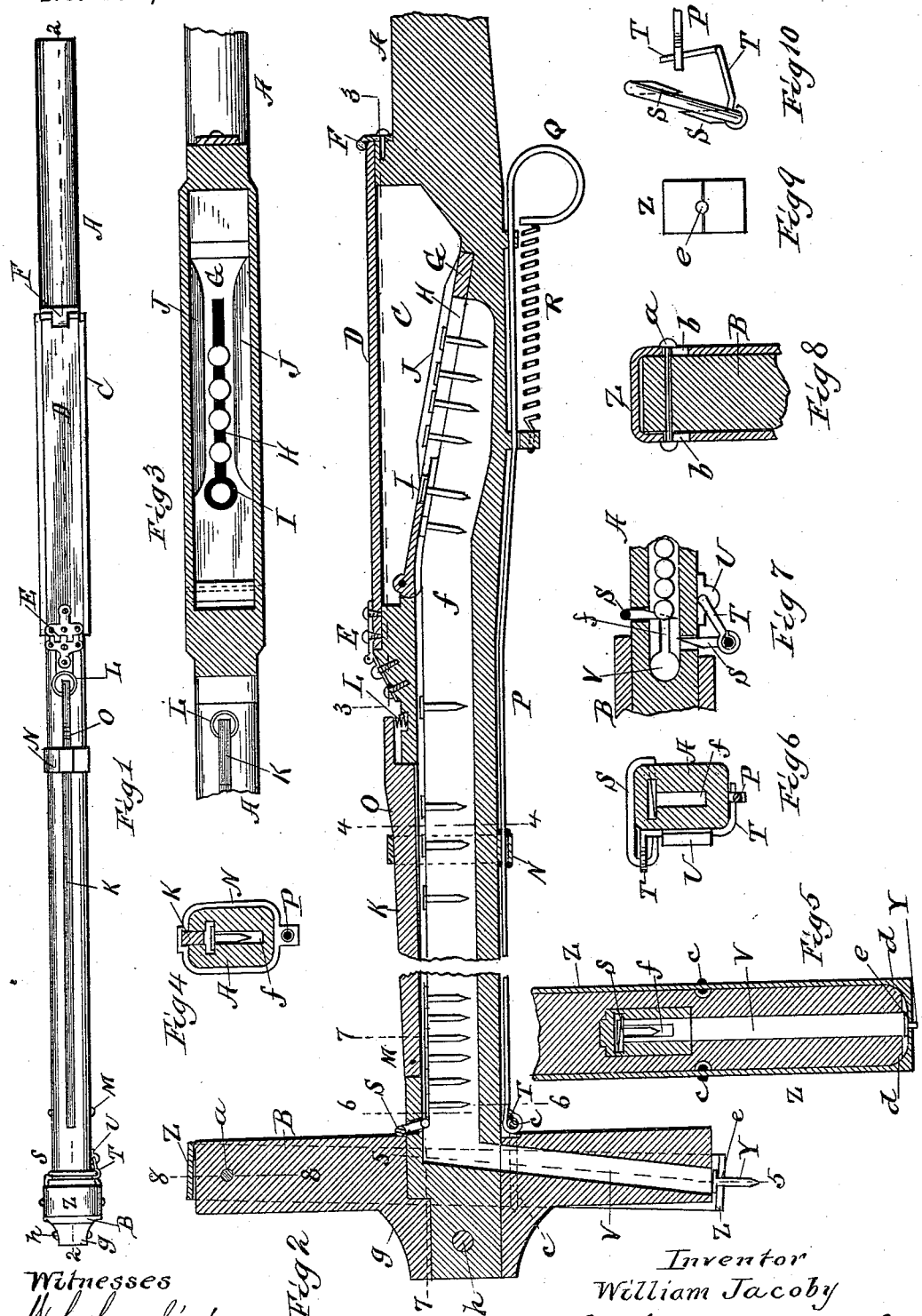
Witnesses
W. C. Coles
A. M. Best
Inventor
William Jacoby
By Coburn & Thacher
Attys

UNITED STATES PATENT OFFICE.

WILLIAM JACOBY, OF FULDA, MINNESOTA, ASSIGNOR OF THREE-FOURTHS TO L. O. BATHEN, OF SAME PLACE, LARNED COBURN, OF BELFAST, AND H. P. LEWIS, OF FULDA, MINNESOTA.

TACK-HAMMER.

SPECIFICATION forming part of Letters Patent No. 470,156, dated March 1, 1892.

Application filed July 2, 1890. Serial No. 357,558. (No model.)

*To all whom it may concern:*

Be it known that I, WILLIAM JACOBY, a citizen of the United States, residing at Fulda, in the county of Murray and State of Minnesota, have invented a certain new and useful Improvement in Tack-Hammers, which is fully set forth in the following specification, reference being had to the accompanying drawings, in which—

Figure 1 is a top view of my tack-hammer; Fig. 2, a vertical central sectional view taken at the line 2 2, Fig. 1. Fig. 3 is a plan view of the tack-box with cover removed, indicated by line 3 3, Fig. 2. Fig. 4 is a transverse sectional view of the handle, taken at the line 4 4, Fig. 2. Fig. 5 is a vertical sectional view of the portion of the hammer-head, taken at the line 5 5, Fig. 2. Fig. 6 is a transverse sectional view of the handle, taken at the line 6 6, Fig. 2. Fig. 7 is a plan sectional view taken at the line 7 7, Fig. 2. Fig. 8 is a vertical sectional view of the top portion of the hammer-head, taken at the line 8 8, Fig. 2. Fig. 9 is a plan view of the face of the hammer-head. Fig. 10 is a detached view of the cut-off device with the double crank-rod T and the end of the rod P.

The object of my invention is to make a tack-hammer with a box in the handle, in which the tacks can be placed in quantities and from which they will feed automatically through the handle and the head of the hammer one by one, so that they can be driven singly, one at each blow, thus dispensing with the necessity of placing the tack in position and holding it with one hand while it is being driven by a tack-hammer.

My invention consists in providing the handle of the hammer with a box and certain appliances and mechanisms by means of which the tacks are fed, passing through the head of the hammer in position to be driven; also, in certain appliances for holding the tacks in place as they are fed through the handle to the hammer-head; also, in certain appliances (or cut-off) by which one tack at a time is allowed to pass into the hammer-head; also, in a certain holder which receives the tack as it passes through the hammer-head and brings it into position to be driven; also, in certain other devices whereby the parts are operated to feed the tacks and drive them, all of which are hereinafter specifically described and made the subject-matter of the various claims. Any one who has used a tack-hammer can readily appreciate the importance of being able to place a quantity of tacks in the box connected with the tack-hammer, from which they are fed automatically into the proper position to be driven by the tack-hammer at the desired place without placing the tack and holding it in position prior to its being driven by the tack-hammer, thus obviating all danger of injuring the fingers and the inconvenience of stooping or reaching with one hand and holding the tack while it is being driven by the hammer held in the other hand.

In the accompanying drawings, A represents the handle of the hammer, which I preferably make of wood; B, the hammer-head, made of metal.

C is a box made in the handle A, which is provided with a lid or cover D, preferably hinged at one end by the hinge E, with a spring-catch F at the opposite end.

There is a false bottom G in the box C, which is inclined, as shown in Fig. 2, and is provided with a slot H large enough for the shank of the tack to pass through, but not large enough for the head of the tack to pass through. At the upper end of this slot there is a hole I sufficiently large for the heads of the tacks to pass through. On either side of this false bottom there is a rib J, inclined toward the slot H to assist in causing the shanks of the tacks to fall through the slot H when the hammer is moved in handling to drive the tacks. As the tacks pass through the hole I, the heads rest upon the upper edge of a deep slot in the handle A, their shanks hanging in this slot, and in this way they pass, one after another, as shown in Fig. 2, down to the head of the hammer B.

There is pivoted in the upper edge of the hammer-handle a long strip of wood or other material K in such a position that it can be pressed down upon the heads of the tacks that hang beneath it. At one end of this strip there is a small spring L, that raises the strip from the heads of the tacks, excepting when the spring is compressed and the strip pressed down upon the heads of the tacks, as hereinafter described. This strip is pivoted at one end, as shown at M. The purpose of this strip K is to hold the tacks in position beneath it in the handle of the hammer by being pressed upon while the operator is striking the blow to drive a tack, keeping the tacks from sliding back toward the box when the hammer is raised. The band N, which encircles the hammer-handle, rests on the top of the strip K near the inclined shoulder O, so that when the band N is drawn back on said shoulder the spring L is compressed and the strip K forced downward upon the heads of the tacks beneath it. The band N is attached to the rod P beneath the hammer-handle. The rod P has at one end a loop Q, through which the finger of the operator extends and by means of which he draws back the rod P, overcoming the tension of the coiled spring R and slides the band N upon the inclined shoulder O, forcing the strip K down, as above specified. The rod P also operates a tack cut-off S by means of the double crank T, the rod P being attached to one arm of the double crank, while the other arm of said double crank is attached to the cut-off S, which is a double-pointed wire hook, the middle of which rests on the hammer-handle close to the hammer-head, having its ends bent downwardly and inwardly across the path of the tacks. The points of the cut-off, as shown in Fig. 7, are sufficiently far apart for the shank of one tack to rest between them, so that when the cut-off is in the position shown in Fig. 7 it holds all the tacks from passing forward toward the head of the hammer; but when the cut-off is moved laterally one point of the cut-off recedes and the other advances across the path of the tacks and the tacks move forward the width of one tack, and when it is moved back that tack is left free to pass forward into the head of the hammer, all the other tacks being kept from advancing. The middle portion of the cut-off extends upward and rests upon the hammer-handle above the points and slides back and forth as the points of the cut-off move alternately across the path of the tacks, as clearly shown in Fig. 6. This cut-off S is operated by a double crank T, the middle portion of which is held in a bearing U on one side of the hammer-handle. One arm of this double-crank rod T is attached to the rod P, whereas the other arm is attached to the cut-off S, so that every time the rod P is drawn back by the finger of the operator by means of the loop Q the cut-off S is moved laterally, and when the rod P is drawn back by means of the spring R the cut-off S is moved in the opposite direction by means of the double-crank rod T, so that at every back and forth stroke of the rod P one tack passes the cut-off S into the head of the hammer and falls immediately into the vertical opening V in the head of the hammer into the position shown at Y, Fig. 2.

There is a vibrating strap Z, which surrounds the hammer-head B, being pivoted to the head by the bolt $a$ by means of a slotted or elongated hole $b$, which admits of a slight upward movement of this vibrating strap Z, as hereinafter specified. The lower portion of this vibrating strap which passes beneath the face of the hammer is divided, as clearly shown in Fig. 9, and has a hole, one half of which is in each divided portion of the strap Z, large enough to receive the shank of a tack, but not large enough for the head of a tack to pass through, so that each tack as it falls from the handle of the tack-hammer after passing the cut-off S is caught by the strap Z, as shown in Fig. 2. The operator then pulls the vibrating strap Z by means of the rod P, which is attached to said strap at $c$, as shown in Fig. 2, bringing the tack under the solid portion of the head of the hammer into position to be driven. When the operator pulls the rod P to bring the tack under the solid portion of the hammer into position to be driven, he at the same time draws the band N onto the shoulder O, thereby pressing the strip K upon the heads of the tacks beneath it in the handle of the hammer and also moves the cut-off S, allowing another tack to pass the first point of the cut-off against the second point. He then strikes his blow, driving the tack. The face of the hammer-head has rounded edges, as shown at $d$ in Fig. 5, which presses against the interior beveled portions of the vibrating strap Z and spreads the two parts of the vibrating strap Z sufficiently to allow the head of the tack to pass through the hole $e$ and drives the tack entirely at one blow. As the sides of the strap C are forced outward by the beveled edges of the hammer-head as the blow is struck they move slightly upward on the pin $a$, on account of the slot $b$, above described.

When the operator has struck the blow and driven a tack, he immediately releases the rod P, and the spring R causes it to move forward, which movement causes the vibrating strap Z to recede to its position to receive another tack, and the cut-off S also is caused to move, allowing a tack to pass it, and at the same time the band N recedes from the shoulder O and releases the strip K from being pressed upon the tacks, and they all slide forward the width of one tack. At each stroke the tacks in the box are sufficiently shaken, so that they are constantly fed into the slot $f$ in the handle of the hammer, as shown in Fig. 2, keeping a constant supply of tacks resting against the cut-off S for a tack to pass at each blow of the hammer, as above described.

I may attach the handle to the hammer-head in any desired way; but I have shown on the side of the hammer-head a boss $g$, in which the handle may be riveted by rivet $h$ or secured in any suitable manner.

The vibrating strap Z may be made in two parts and not extend entirely over the top of the hammer-head B; but it must be made so that it will receive and hold the tack, as described, until the tack is moved back beneath the solid part of the hammer-head to be driven. It must also have the capacity of springing outward when the blow is struck to relieve the tack. I make the face of this vibrating strap Z flat, so that if the tack is not entirely driven by one blow another blow may be struck before the operator releases the rod P to admit of the vibrating strap to recede to receive another tack.

I find in practical operation that a handful of tacks placed in the box C will feed through the false bottom G in the box into the position shown in the handle, their shanks hanging in the slot $f$ sufficiently fast to supply a tack to pass the cut-off S at every blow of the hammer or at each time the cut-off is moved back and forth.

I find no difficulty in feeding the tacks regularly nor in the operation of the vibrating strap Z, which receives a tack and brings it back under the solid portion of the hammer-head in position to be driven.

I have constructed a hammer with which tacks can be driven rapidly and accurately.

Having thus described my invention, what I desire to secure by Letters Patent is—

1. In a tack-hammer, the nail-box C, located within the hammer-handle, the hammer-handle A, having within it the slot $f$ to receive the tacks and hold them suspended by their heads in the handle and extending from the tack-box to the hammer-head, and the bottom G of the box, provided with a slot large enough for the tack-shanks and smaller than the tack-heads and a hole at the end of the slot large enough for the tack-head to feed the tacks one by one through said hole into the slot $f$ by the movement of the hammer, substantially as specified.

2. In a tack-hammer, the handle A, provided with a box C, a slot in the hammer-handle extending from the box to the hammer-head in which the tacks hang suspended, the cut-off S, the points thereof being adapted to alternately extend across the path of the tack in the handle as it is moved back and forth, mechanisms attached to the hammer-handle, adapted to operate the cut-off by the operator's hand which holds the hammer, the hammer-head B, provided with the vertical opening V, and suitable mechanisms in the hammer-head to catch and hold each tack as it passes the cut-off through said opening till a blow is struck to drive the tack, substantially as specified.

3. The combination, in a tack-hammer, of the head B, provided with vertical opening V, the slotted hammer-handle A, and the vibrating strap Z, substantially as specified and shown.

4. The vibrating strap Z, being severed below and having its lower interior corners beveled, and the hammer-head B, having its corresponding edges beveled and adapted to act against the beveled corners to spread the lower part of the vibrating strap Z and to discharge the tack between the lower edges of the strap, substantially as specified and shown.

5. The combination, in a tack-hammer, of the rod P, the spring R, the band N, gliding over a beveled shoulder, and the pivoted strip K, which is pressed upon the tack-heads by means of the band N, and the slot $f$, against whose upper edges the tack-heads are pressed, substantially as described.

6. The combination, in the tack-hammer, of the rod P, the pivoted vibrating strap Z, and cut-off S, so arranged that at each stroke of the rod the tack-holder Z is vibrated as well as the tack cut-off S, substantially as specified.

WM. JACOBY.

Witnesses:
WILSON BORSH,
WM. M. DAVIS.